Figure 12:
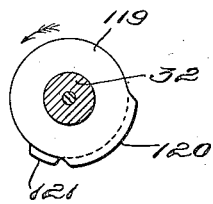

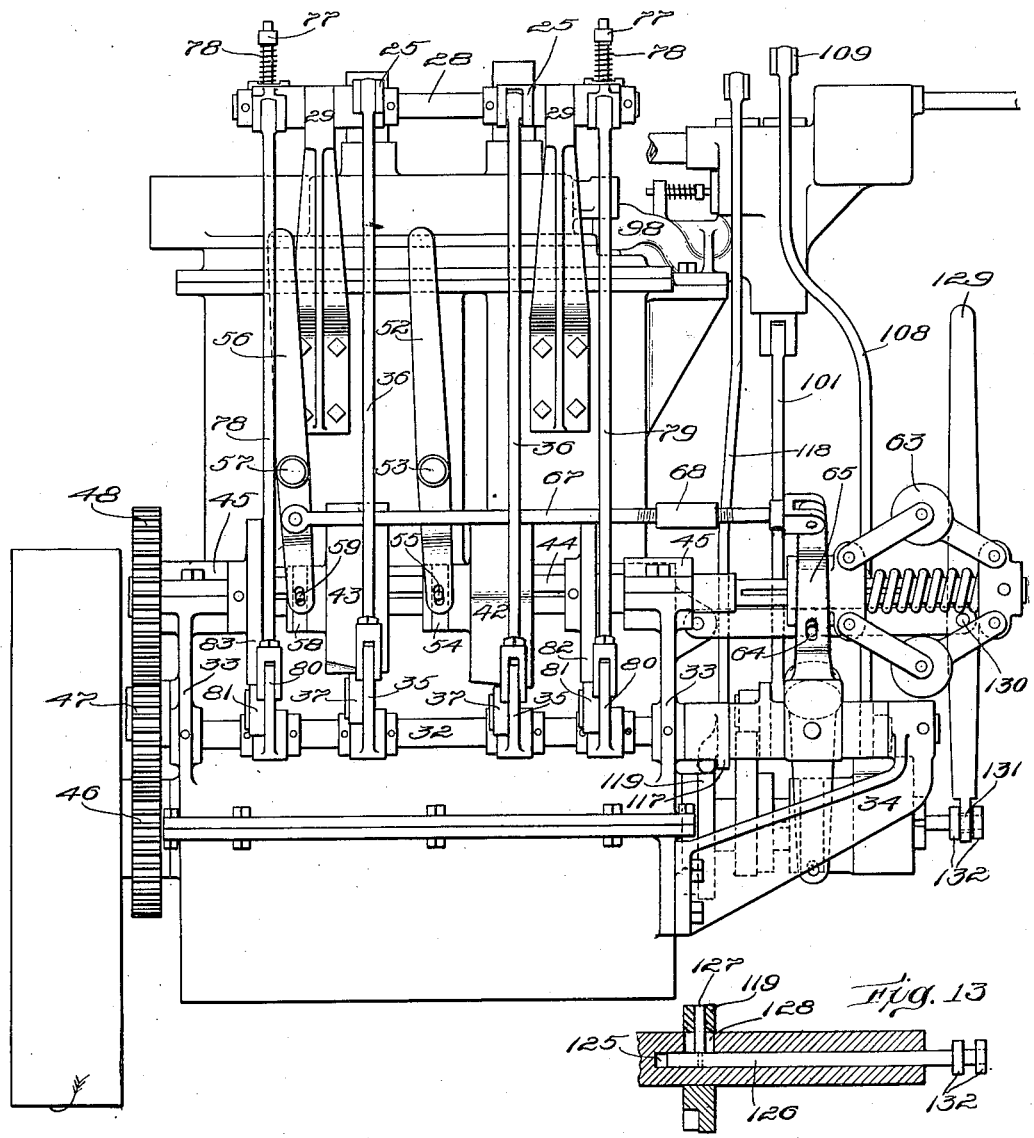

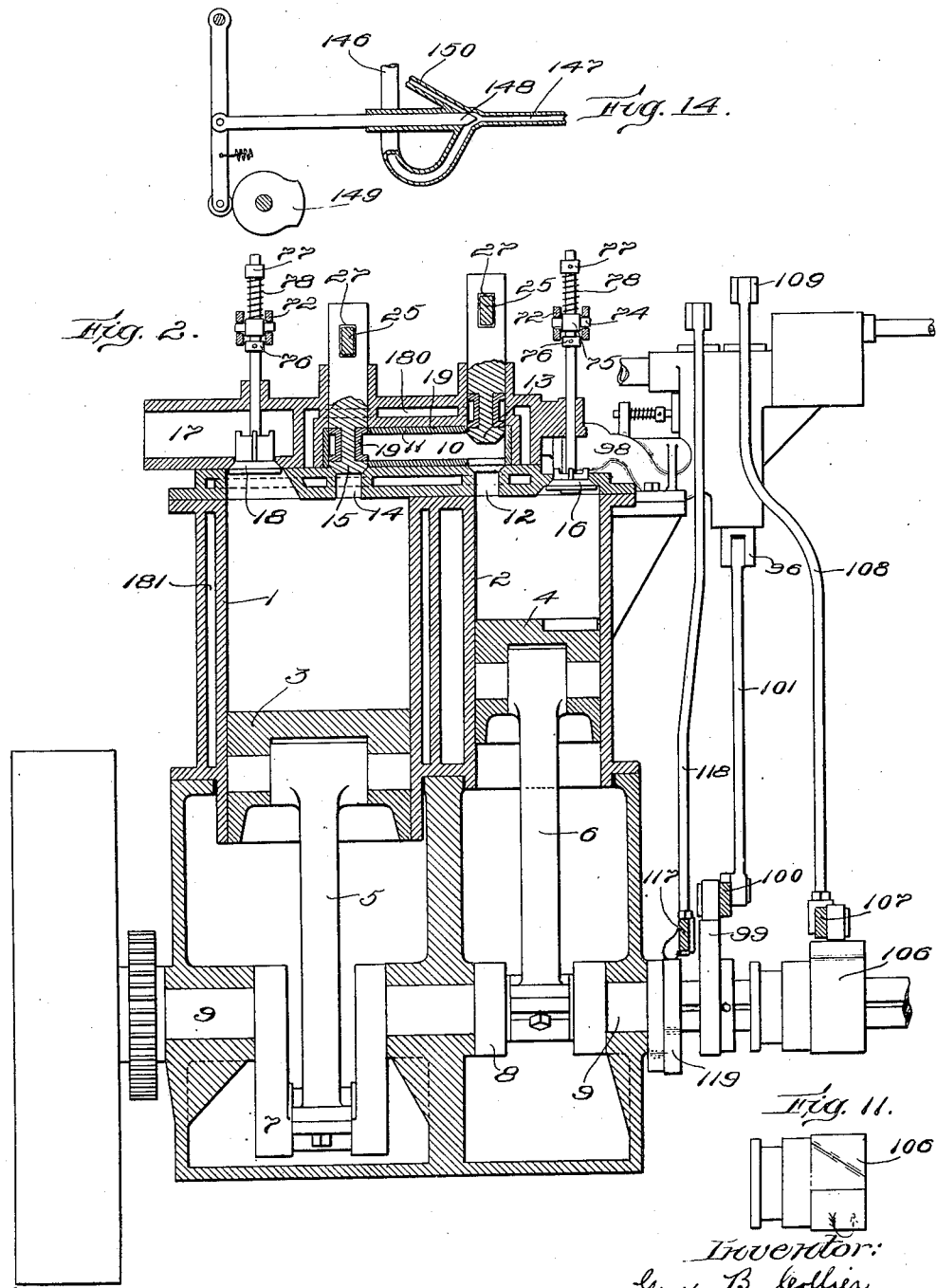

G. B. COLLIER.
HYDROCARBON MOTOR.
APPLICATION FILED FEB. 25, 1909.
1,130,148.
Patented Mar. 2, 1915.
6 SHEETS—SHEET 3.
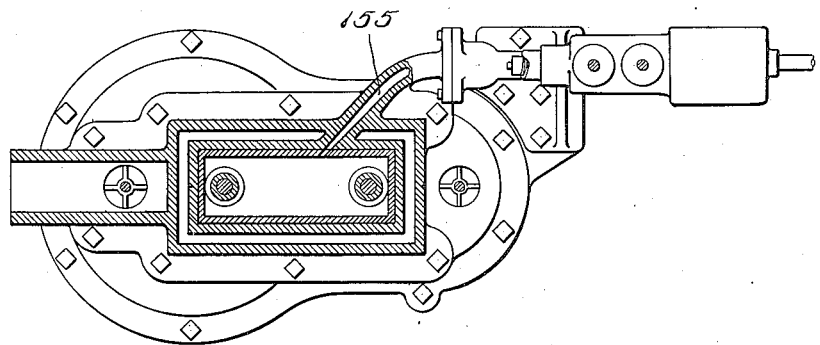
Fig. 15.
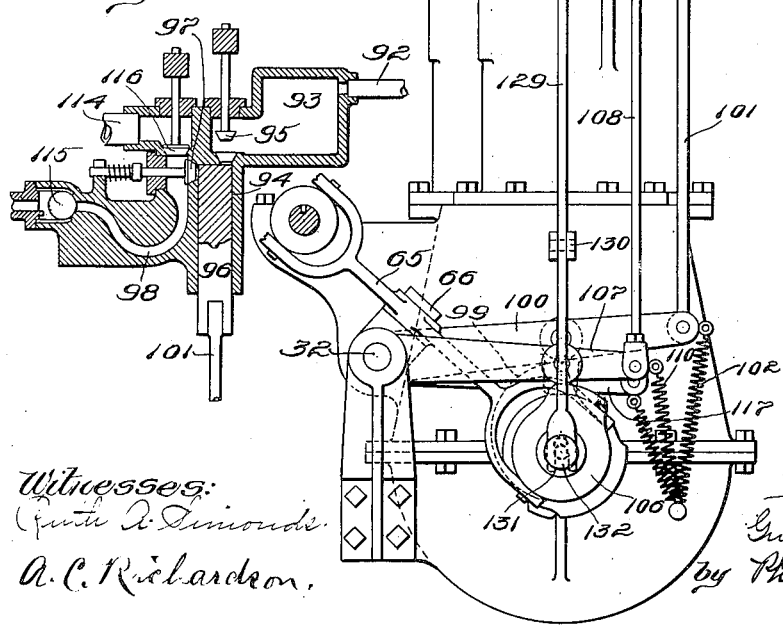
Fig. 9.
Fig. 3.
Witnesses:
Inventor:
Guy B. Collier
by Phillips, Van Cren & Fish
Attys.

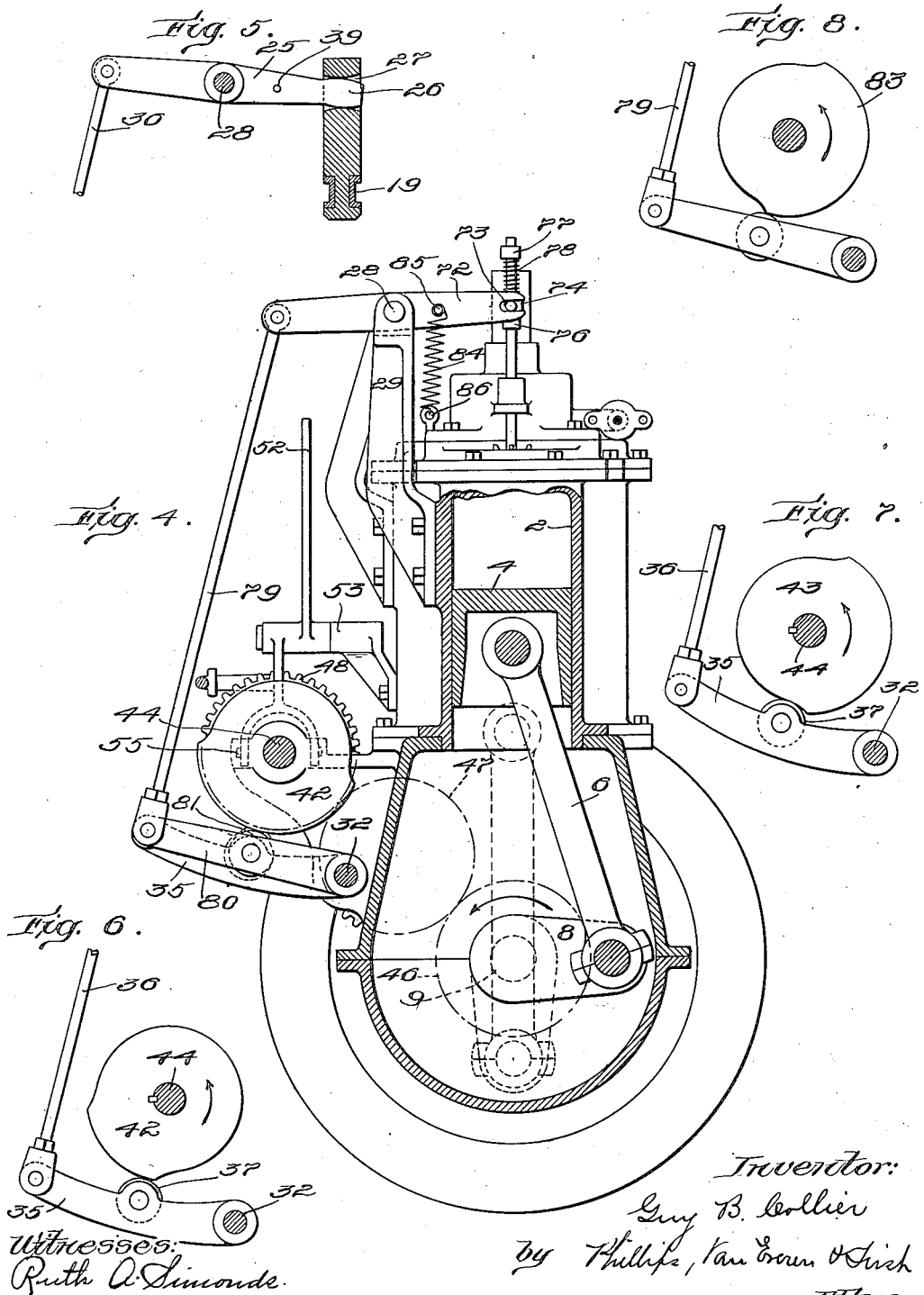

G. B. COLLIER.
HYDROCARBON MOTOR.
APPLICATION FILED FEB. 25, 1909.

1,130,148. Patented Mar. 2, 1915.
6 SHEETS—SHEET 5.

Witnesses:
Ruth A. Simonds.
A. C. Richardson.

Inventor.
Guy B. Collier
By Phillips, Van Everen & Fish
Atty

UNITED STATES PATENT OFFICE.

GUY B. COLLIER, OF KINDERHOOK, NEW YORK.

HYDROCARBON-MOTOR.

1,130,148. Specification of Letters Patent. Patented Mar. 2, 1915.

Application filed February 25, 1909. Serial No. 479,858.

*To all whom it may concern:*

Be it known that I, GUY B. COLLIER, a citizen of the United States, residing at Kinderhook, in the county of Columbia and State of New York, have invented certain new and useful Improvements in Hydrocarbon-Motors; and I do hereby declare the following to be a full, clear, and exact description of the invention, such as will enable others skilled in the art to which it appertains to make and use the same.

The present invention relates to hydrocarbon motors and to an improved method for operating the same.

It is a well recognized fact that the efficiency of hydro-carbon motors depends, among other things, upon the initial pressure or compression at which combustion of the fuel begins, and many attempts have been made to construct a hydro-carbon motor adapted to operate with a high compression. Such attempts, however, have heretofore proved unsuccessful by reason of the mechanical, thermal and chemical effects of the high temperature and pressures incident to high compression.

One of the objects of the present invention is to provide a hydro-carbon motor, which, by reason of high initial compression, may operate with an increased efficiency, at the same time avoiding the various defects inherent in high compression motors of the prior art.

It is also well recognized that high efficiency in a hydro-carbon motor requires perfect and complete combustion of the fuel, and another of the objects of the present invention is to construct a hydro-carbon motor which shall operate with a more complete and perfect combustion of the fuel than has heretofore been obtained in motors as at present constructed.

Still another object of the present invention is to devise a method of operating hydro-carbon motors which shall increase their efficiency and cure many of the defects inherent in the present methods of operating such motors.

These, as well as other objects of the present invention, are secured in general by providing a combustion chamber separate and distinct from the working cylinder of the motor and normally out of communication therewith, delivering fuel into the air or other combustion-sustaining medium contained in this chamber and at a temperature above the temperature of ignition of the fuel, and then permitting the gases in the chamber, which are at an extremely high temperature and pressure, to expand into the working cylinder and by their further expansion in that cylinder to convert their heat energy into mechanical work.

Figure 10:
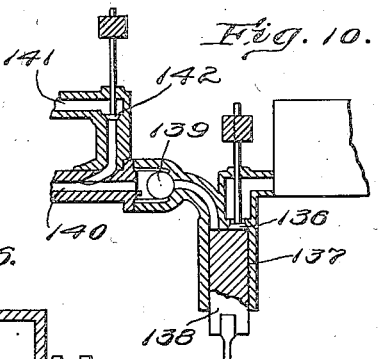
Figure 16:
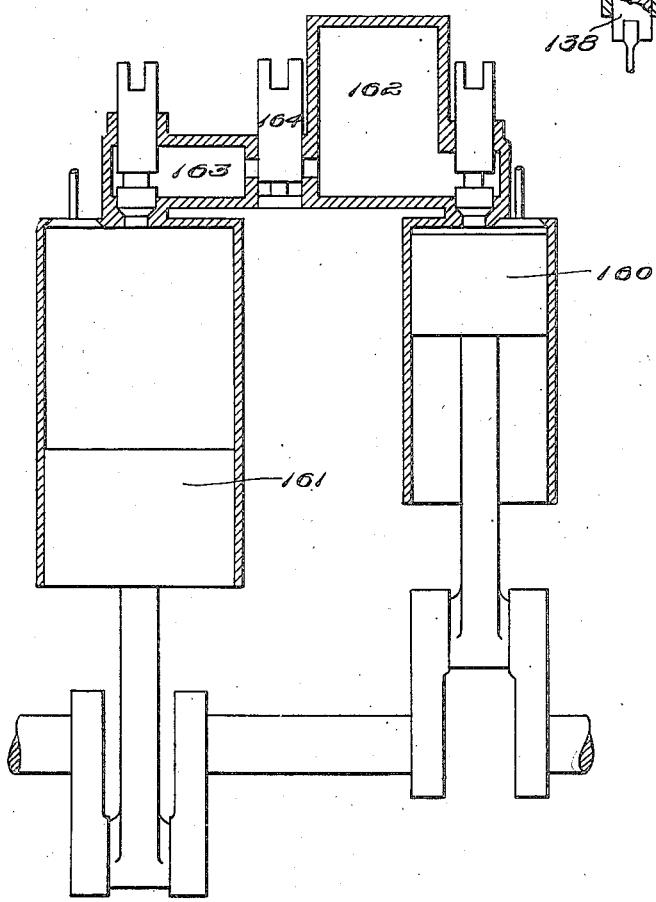
Figure 17:
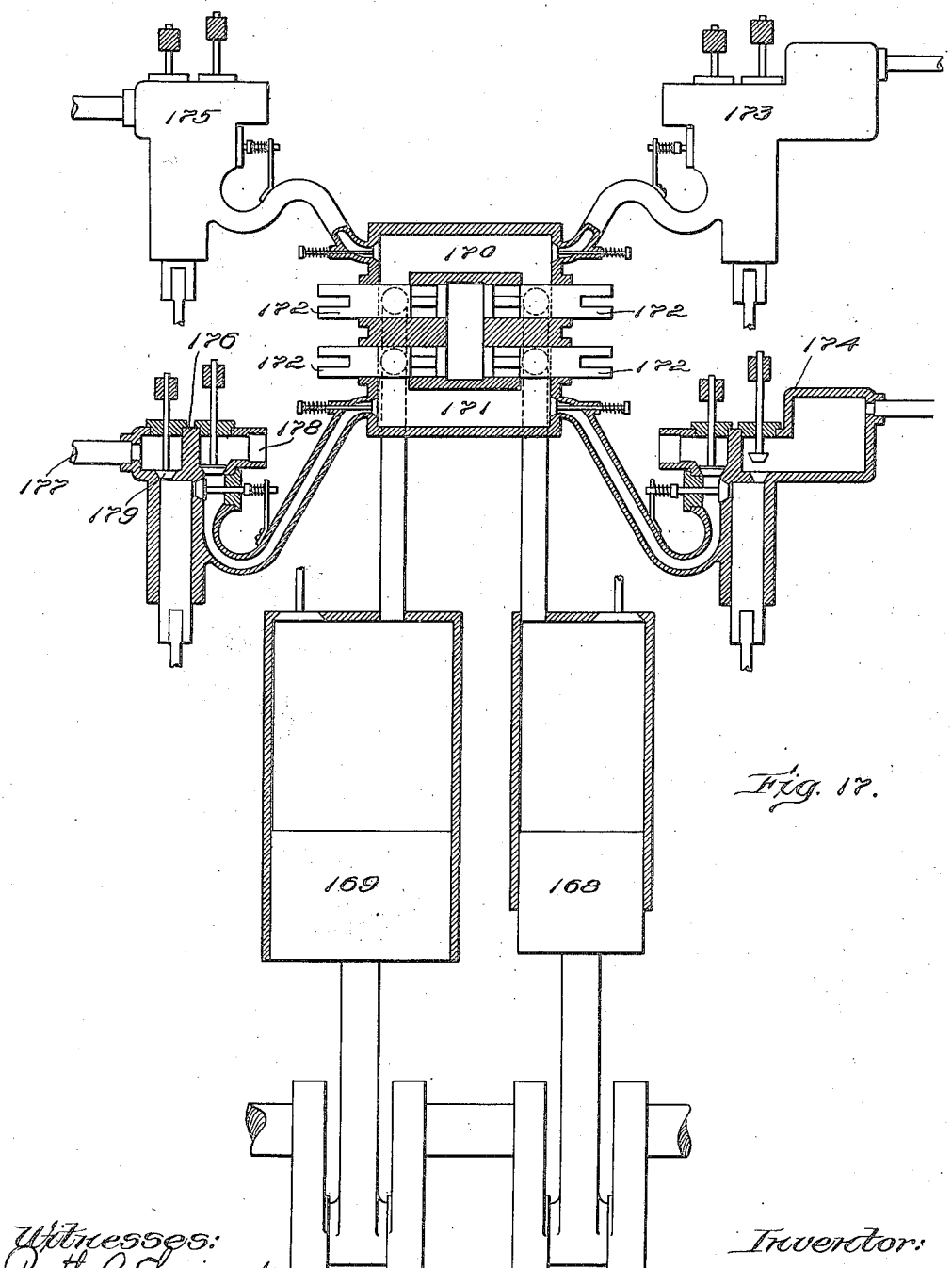

In the accompanying drawings which illustrate a hydro-carbon motor embodying the constructions and practising the method of the present invention Figure 1 is a side elevation of the motor; Fig. 2 is a similar view partially in section; Fig. 3 is an end elevation, looking from the right in Fig. 1, with some of the parts removed; Fig. 4 is a similar view but partially in section; Figs. 5, 6, 7 and 8 illustrate details of the mechanism for actuating the valves of the cylinders; Fig. 9 is an enlarged, vertical, longitudinal section of the fuel controlling mechanism; Fig. 10 is a similar view showing a modified form; Figs. 11, 12 and 13 are details of portions of the fuel controlling mechanism; Fig. 14 is a modification of a portion of such mechanism; Fig. 15 is a top plan view of the motor, showing the combustion chamber in horizontal section; Figs. 16 and 17 illustrate modifications in the general construction of the motor.

The hydro-carbon motor illustrated in the drawings is provided with two cylinders, a working or power cylinder 1 and a compressor cylinder 2 (see Fig. 2). Within the cylinders are the usual pistons 3 and 4 carrying the connecting rods 5 and 6, the lower ends of which are connected with the cranks 7 and 8 of the main shaft 9. As shown in Fig. 4, the crank for the compressor is set 90° ahead of the crank for the power cylinder, for a purpose which will be hereinafter explained. Located at the top of the motor is the combustion chamber 10 which is preferably provided with a lining or linings 11 of some refractory and heat insulating materials such as larvite and asbestos, or other suitable substances to withstand the intense heat and to reduce so far as possible the heat losses to the walls of the chamber. The combustion chamber is connected at one end with the compressor cylinder 2 by the inlet port 12, controlled by the valve 13, and is connected at the other end with the working cylinder 1 by the outlet port 14 controlled by the valve 15. The supply of air to the compressor cylinder is controlled by the air intake valve 16, while the exhaust from the working cylinder into the exhaust pipe 17 is controlled by an exhaust valve 18.

Preferably, the volumes of the compressor cylinder, of the combustion chamber, and of the working cylinder, are so proportioned relatively to each other that normally a substantial excess of air will be supplied to the combustion chamber and the hot gases will be expanded to about atmospheric pressure at the end of the power stroke of the working piston. The excess of air permits increase of the fuel charge to take care of an overload, as will hereafter be described, while the complete expansion under normal conditions results in high efficiency of operation.

The general mode of operation of the motor thus far described is as follows:—Air is first drawn into the compressor cylinder 2 by the downward stroke of the piston 4, valve 16 being held open. As piston 4 starts back on its compression stroke valve 16 closes and valve 13 opens, and as the piston rises the contents of the cylinder are forced through port 12 and into the combustion chamber 10. The heat derived from the compression of the air into this chamber and from the chamber itself, which, during the operation of the motor, is maintained at a high temperature, raises the temperature of the air above the temperature of ignition of the fuel so that after valve 13 is closed and the fuel is supplied to the chamber, it ignites and the resulting combustion raises the temperature and pressure in the chamber. Valve 15 is now opened, permitting the contents of the combustion chamber to expand through the port 14 into the power cylinder 1, and by their further expansion to drive the piston 3 downward to cause it to make its power stroke. On the return or upward stroke of this piston, valve 15 having been previously closed, the exhaust valve 18 opens, and the burnt gases are forced out of the cylinder into the exhaust pipe 17. Meanwhile the compressor, since its crank is in advance of the power crank, has compressed another charge of air into the combustion chamber, fuel has been supplied thereto, and the hot gases under high pressure are ready to be admitted to the power cylinder as soon as the power piston has completed its exhaust stroke.

The advantages resulting from the general construction and mode of operation thus far described are obvious. In the first place since combustion occurs in a chamber separate and distinct from, and normally out of communication with, the working cylinder, very much higher compression and temperature may be employed than would be possible in the power cylinder itself on account of the necessity of providing proper lubrication for the moving piston. Even where excessively high temperatures and pressures are employed, lubrication will not be interfered with, since both compression and combustion take place outside of the working cylinder and the only time when heat may be absorbed by the piston or cylinder walls is during the expansion stroke when the temperature of the gases is rapidly falling. Furthermore, by causing the combustion to take place in a chamber out of communication with the working cylinder, a very much longer combustion period or time within which combustion may occur is obtained than where the combustion takes place in the cylinder itself or in a chamber in open communication therewith, so that a correspondingly slower rate of combustion may be employed. Not only does this result in a more perfect and complete combustion of the fuel, thus increasing the efficiency of the motor as well as avoiding the objectionable chemical action and deposits upon the piston head and cylinder walls of the working cylinder following from incomplete and imperfect combustion, but it also permits the use of fuels which heretofore, on account of the relatively long time required for their combustion, have not been capable of successful use in these motors.

Another advantage gained by the separate combustion chamber having no movable piston therein is that it permits the use of a lining as above described which shall not only resist the destructive effect of the high temperatures, but which shall also by its heat insulating properties, prevent so far as possible the escape of heat to the walls of the chamber and the consequent loss in efficiency.

Still another feature of importance of the general structure above described is that by varying the relative time of delivery of the fuel into the combustion chamber, the motor may be caused to operate upon either the Otto or the Diesel cycles or upon any desired combination of those cycles. For example, if the fuel be supplied to the combustion chamber sufficiently early before the valve 15 between the chamber and the working cylinder is opened so that combustion may have been completed in the chamber, the full charge under maximum pressure and temperature will, on the opening of that valve, expand into the cylinder, giving an expansion and exhaust curve on an indicator card similar to that produced by the typical Otto cycle motor. On the other hand if injection of fuel be delayed until just as the valve 15 is opening and is continued for a substantial portion of the downward stroke of the power piston, the power stroke will be similar to that of the Diesel cycle. By varying the point and duration of the injection of the fuel, any desired combination of the Otto and Diesel cycles may be obtained.

An advantage of considerable importance obtained by the present construction, particularly when the motor is operating upon the Otto cycle, is the avoidance of all possibility of pre-ignition, a very troublesome feature heretofore in all high compression motors operating upon that cycle. This general construction of motor is also peculiarly adapted for the scavenging of the combustion chamber after each charge of fuel has been burned therein, driving out all traces of the products of combustion and providing pure air for each successive charge of fuel which may thus be burned most efficiently. It will be observed that it is only necessary to open momentarily the outlet port valve 15 between the combustion chamber and the working cylinder after the pressure of the compressed air which is being forced into the chamber from the compression cylinder exceeds that in the working cylinder. Preferably this scavenging operation will take place at minimum pressure differences, and will be accomplished by so timing the opening of inlet port valve 13 that this will not occur until the pressure in the compression cylinder is substantially the same or but slightly above that in the chamber, the closing of outlet port valve 15 through which the hot gases from the previous combustion have been expanding into the working cylinder being just sufficiently delayed after this instant to permit the foul gases to be forced out of the combustion chamber into the working cylinder. Not only is scavenging under minimum pressure differences the most efficient, but by driving the residue of the burned gases into the working cylinder where they may expand and do work instead of wasting their energy by exhausting directly into the open air, the scavenging operation is performed with a comparatively small expenditure of energy.

While any suitable valve mechanism may be employed for the compressor and working cylinders and for the combustion chamber, the specific devices shown in the drawings comprise, briefly, rocking levers mounted on the top or head of the motor and connected at one end to the valve spindles and at the other end by means of rods to cam levers actuated by suitably formed cams upon a rotating cam shaft. The combustion chamber inlet and outlet port valves 13 and 15 are alike, both being of the balanced puppet type and provided like the combustion chamber itself with a lining 19 of heat resisting and insulating material.

The connection between the rocking levers 25, which actuate valves 13 and 15, and the stems of these valves is illustrated in Fig. 5, the somewhat rounded end 26 of the lever entering the slot or recesses 27 in the stem of the valve. The rocking levers are all mounted upon the fixed shaft 28 supported in the brackets 29, while the cam levers are all mounted upon another fixed shaft 32, which is carried by the webs 33 on the upper crank case casting, the extreme right hand end of the shaft, as seen in Fig. 1, receiving additional support from a bracket 34 attached to the lower crank case casting.

The cam levers 35, which are attached at their outer ends to rocking levers 25 by means of the connecting rods 36, each carry rolls 37, which engage the valve actuating cams, being held in contact therewith by means of tension springs attached at one end to the pins 39 on the rocking levers 25, and at the other to the head of the cylinders. The cams for controlling these valves 13 and 15 are indicated by the reference characters 42 and 43 respectively, the former being shown in side elevation in Fig. 6 and the latter in a similar position in Fig. 7. These cams are both mounted upon, and compelled to rotate with, the cam shaft 44, being splined upon said shaft for a purpose shortly to be described. The cam shaft is mounted in the bearings 45 and is rotated at the same speed and in the same direction as the main shaft 9 by means of the gears 46, 47 and 48. It will be observed that these cams act positively to open the valves, the closing being effected by suitable springs (not shown) as soon as the high portions of the cams pass out of engagement with the cam rolls. Figs. 6 and 7 indicate the relative position of the cams 42 and 43 and cam levers 35 when the valves 13 and 15 are in the position shown in Fig. 2, the working piston at this time just completing its power stroke and the compressor piston rising on its compression stroke. While the hydrocarbon motor herein described may be practically and successfully operated with the times of opening and closing of these valves 13 and 15 fixed and unvarying, still it is desirable to provide means for shifting these times of operation or some of them not only for the purpose of adapting the motor for operation at high efficiency with different fuels and under different conditions as to speed and power, but also for the purpose of providing a convenient and simple means for controlling the output of the motor. To this end the disks for cams 42 and 43 are of considerable width and the high or operative portions of the cams are made of varying peripheral length by having one of their faces angularly disposed with relation to the axis of rotation. For example, the advancing face of cam 42 is inclined, while the following face is parallel to the axis of rotation, so that by shifting the cam disk longitudinally of the cam shaft the time of opening of the valve 13 may be varied although its time of closing remains unaltered. A convenient means for shifting the cam disk is shown in the drawings and comprises the shipping lever 52 mounted upon the fixed stud 53 and having its lower end forked to straddle the shipping ring 54 to which it is connected by the usual pin and slot connection 55.

Cam 43 for the outlet port valve 15 is constructed similar to cam 42 except that the following face is inclined and the advancing face parallel to the axis of rotation, so that by shifting the cam disk longitudinally of the shaft the time of closing of this valve may be varied, its time of opening, however, remaining unchanged. A similar shipping mechanism is also provided consisting of the lever 56 on stud 57, shipping ring 58, and pin and slot connection 59.

If the motor is to operate under a substantially uniform and unvarying load, the cams will be so adjusted longitudinally of the cam shaft that the inlet port of the valve 13 will be opened, as before suggested, when the pressure in the compression cylinder is substantially equal to or but slightly above that existing in the combustion chamber 10, the outlet port valve 15 being held open at this time to permit the combustion chamber to be scavenged into the working cylinder. Inasmuch, however, as these motors as a general practice operate with constantly varying and fluctuating loads, it is not only desirable but necessary to provide means for varying the output of the motor in accordance with the demands upon it, and one method of accomplishing this is by shifting the time of operation of these valves and particularly the time of closing of the outlet port valve 15. While normally this valve will be arranged to close just after the inlet port valve 13 has been opened, it is apparent that if the closing of the outlet port valve 15 be still further delayed, a more or less substantial portion of the charge of compressed air which is being forced into the combustion chamber 10 for the combustion of the next charge of fuel may escape therefrom into the working cylinder, so that the compression in the combustion chamber will be materially reduced. On the other hand, if the outlet port valve 15 be closed before the inlet port valve 13 opens, and while a considerable pressure still exists in the combustion chamber, the subsequent compression into that chamber of the entire charge of compressed air will very materially increase the compression over the normal. When the load on the motor, therefore, diminishes the output of the latter may be decreased by delaying the closing of the outlet port valve 15, while if the load be increased the motor may still be able to meet the demands upon it if this valve be closed early. A very considerable overload may thus be taken care of, a feature of great importance in connection with hydro-carbon motors.

The mechanism for shifting the cam 43 to vary its time of closing in accordance with the demands upon the motor consists briefly of speed controlled mechanism operatively connected to the cam to shift the latter in the proper directions along the cam shaft, when the speed of the motor varies under increase or decrease of load. This mechanism comprises a ball governor 63 connected by pin-and-slot connection 64 to the inclined shipping lever 65 pivoted midway its ends at 66 and connected at its upper end with the shifting lever 56 by means of the connecting rod 67. This rod is preferably made in two parts and connected by a turnbuckle 68, which, by means of right and left hand threads, permits the length of connecting rod 67 to be varied for the purpose of adjusting the position of cam 43 beneath the cam roll 37.

The operation of this mechanism is obvious. If the load on the motor be decreased and the speed rises, the governor weights will move outwardly, moving the upper end of lever 65 toward the right in Fig. 1, and with it the connecting rod and cam disk 43, bringing the longer portion of the high part of the cam beneath the cam roll and causing the outlet port valve 15 to close later. On the other hand, if the speed falls owing to increase in the load, the shipping lever will be actuated in the opposite direction and the cam disk moved toward the left in Fig. 1, bringing the shorter portion of the high part of the cam beneath the cam roll and causing an early closing of this valve. If at any time, however, it is desired to throw the governor out of action, either momentarily or for a substantial period of time, this may be done by means of the hand lever 56, any suitable locking mechanism being provided if necessary to retain the lever in the desired position.

The specific mechanism for actuating the intake valve 16 of the compressor cylinder and the exhaust valve 18 of the power cylinder is very similar to the mechanism already described for actuating the inlet and outlet port valves 13 and 15, except that no provision is made for varying the time of operation of these valves and the valves are opened by a downward movement instead of by an upward movement. The form of connection, therefore, between the rocking actuating levers on the top of the motor and the valve spindles is somewhat different. As shown in Figs. 2 and 4, these rocking levers 72 are forked to straddle the valve spindles, and each arm of the fork is provided with a slot 73 to receive the pin 74 of the sliding sleeve 75, collars 76 and 77 being fixed to the spindle below and above the sleeve and a coiled spring 78 being interposed between the sleeve and the upper collar 77 to provide a yielding connection between the rocking lever and the valve to insure closing of the valve without injury. The rocking levers 72 are pivoted upon the fixed shaft 28 and are connected by the rods 79 to the ends of cam levers 80 pivoted upon the fixed shaft 32 and carrying the cam rolls 81. The cam 82 for the intake valve 16 is shown in side elevation in Fig. 4 while the cam 83 for the exhaust valve 18 is shown in side elevation in Fig. 8, these cams being in the relative positions which they occupy when the other parts of the motor are as shown in Fig. 2. Springs 84 attached at one end to the pin 85 on the rocking lever 72 and at the other end to the eye 86 on the head of the motor tend normally to open the valves, the cams acting to close them. In the motor of the drawings, no provision is made for varying the time of operation of these valves, the intake valve 16 opening just after the compressor piston starts on its suction stroke, and closing when it reaches the end of that stroke, and the exhaust valve 18 opening when the power piston begins its exhaust stroke and closing at the end of the same.

The motor shown in the drawings is especially designed for operation with a liquid fuel, and the mechanism for supplying such fuel to the combustion chamber comprises measuring devices which measure off a predetermined charge of fuel and delivery devices for delivering such charge to the motor. The principal feature of the measuring devices consists of a fuel pump, the inlet valve of which is preferably speed controlled, so that the amount of the charge of fuel drawn into and delivered from the pump cylinder is varied, dependent upon the speed of the motor. The delivery devices are shown in two forms; one in which the measured charge is injected into the combustion chamber by a blast of compressed air or of steam, and another in which the measuring pump itself forces the charge into the chamber. Auxiliary devices are also shown which may be employed for the purpose of causing the latter portion of the charge to be injected at the same or even at a higher rate than is the former portion.

In the measuring and delivery mechanism shown in Fig. 9 of the drawings, 92 represents the fuel supply pipe which leads from some source of supply to the fuel chamber 93. The liquid fuel passes from this chamber into the pump cylinder 94, when the measuring valve 95 is raised, as shown, on the downward or suction stroke of the pump cylinder 96. On the upward or forcing stroke of the pump piston, measuring valve 95 being at that time closed, the fuel is forced through the check valve 97 and into the trap or depression 98, ready to be injected into the combustion chamber at the proper time and in the manner shortly to be described. The pump piston 96 is actuated by a cam 99 fixed upon the main shaft of the motor to make a full suction and forcing stroke for each revolution of the main shaft by means of the cam lever 100 pivoted at one end upon the fixed shaft 32, and connected at the other end with the pump piston by the rod 101. The spring 102, one end of which is attached to the cam lever, and the other to the lower crank case casting, tends to depress the cam lever and hold its cam roll in contact with the cam, the suction stroke of the pump piston being effected by the spring while the forcing stroke is positively produced by the cam.

The measuring valve 95 is actuated by means of a cam 106 on the main shaft of the motor through the medium of the cam lever 107 pivoted upon the fixed shaft 32, and connected by means of the rod 108 and arm 109 with the stem of the valve, spring 110 tending normally to close the valve. This valve is arranged to be opened at the beginning of the suction stroke of the pump piston, but its time of closing is rendered variable in order that the amount of the charge drawn into the pump cylinder may be diminished or increased according to the demands upon the motor, and coöperates with the valve actuating devices heretofore described in maintaining the motor speed substantially constant. This variable closing of the measuring valve is accomplished by means of the cam 106 (see Fig. 11) which is formed upon a relatively wide cam disk, the advancing face of the cam being parallel, while the following face is inclined to the axis of rotation of the cam. This cam is splined upon the main shaft, and is arranged to be moved longitudinally thereon by the ball governor 63 and the inclined shipping lever 65. If the speed of the motor diminishes, due to an increase in the work demanded of it, the governor will shift the cam 106 to the right in Figs. 1 and 2, bringing a longer portion of the high part of the cam beneath the cam roll so that the time of closing of the measuring valve will be correspondingly delayed, and an increased charge of fuel will be thereafter supplied to the motor, the excess of air supplied to the combustion chamber taking care of the increase in the fuel charge. If the speed increases, on the other hand, the reverse operation takes place, and through the early closing of the measuring valve, the charge is cut down to meet the lessened demand for power.

The delivery devices shown in Fig. 9 comprise a compressed air pipe 114 (steam may be used if desired) leading from some suitable source of supply, and through which air may be admitted behind the charge of fuel in the trap 98 to force or inject the fuel past the ball check valve 114 and into the combustion chamber. The valve for controlling the compressed air supply is shown at 116, and is actuated by a suitably shaped cam on the main shaft of the motor through the cam lever 117 and connecting rod 118. The motor shown in the drawings, as already pointed out, is adapted, so far as its general organization and construction are concerned, to operate upon either the Diesel or Otto cycles, or any desired combination of such cycles, the time and duration of admission of the fuel to the combustion chamber determining the cycle. And in the drawings special provision has been made whereby the motor may operate upon either the Otto or the Diesel cycle as may be desired, a double cam, as it were, being employed for actuating the compressed air valve, one portion of the cam being so formed and timed as to cause the Otto cycle to be carried out, while the other portion is designed for the Diesel. This cam, indicated at 119 (Figs. 1 and 2) is shown in side elevation in Fig. 12, the portion marked 120 being for the Otto cycle, while that marked 121 is for the Diesel. The advancing face of portion 120 is so timed relative to the other moving parts of the motor that the injection of the fuel will begin immediately after the compressor piston has finished its compression stroke and the inlet port valve 13 has been closed, and such injection may continue for substantially a quarter of a revolution of the main shaft, and until the piston has reached its upward position and the outlet port valve 15 is about to open. The advancing face of portion 121, on the other hand, which produces the Diesel cycle, is shown as so timed that the injection of the fuel will begin substantially when the power piston reaches the end of its upward stroke and the outlet port valve 15 is opening, the peripheral length of the portion 121 being such that the injection will continue for about 1/11 of the downward or power stroke of the piston. In order that either one or the other of these cam surfaces may be rendered operative and the motor caused to run upon either the Otto or the Diesel cycle, as may be desired, the cam disk 119 is mounted upon the main shaft so that it may be moved longitudinally thereon to bring one or the other of its cam portions beneath the cam lever 117 as shown in Figs. 1 and 13 of the drawings. With this purpose in view, the end of the main shaft is bored to form a circular recess 125 within which is slidingly mounted the rod 126, to which is secured the cam disk 119 by the pin 127, one end of which enters the cam disk 119 and the other the rod 126, the intermediate portion passing through a longitudinal slot or recess 128 in the shaft. The pin in the slot compels the cam to rotate with the shaft yet at the same time permits the former to be moved longitudinally along the latter to bring either the Otto or Diesel cam into operative position. A hand lever 129 mounted upon the pivoted link 130 and having its lower end bifurcated at 131 to straddle the rod 126 between the two collars 132, permits the operation of the motor upon either cycle and the change from one to the other without stopping the motor. If desired, the motor may be started in operation on one cycle and then shifted over to the other cycle, or such a change may be made at any time in the regular operation of the motor to meet changed conditions.

In the modified form of fuel delivery mechanism shown in Fig. 10, the charge of fuel previously measured off by the measuring valve 136 and drawn into the pump cylinder 137 on the suction stroke of the pump piston 138 is forced by the pump piston itself on its upward or power stroke past the ball-check valve 139 and through the fuel pipe 140 into the combustion chamber. If desired, a supplemental blast or puff of compressed air or steam may be admitted from pipe 141 by valve 142 to the fuel pipe 140 to force whatever fuel may be left in the pipe, and particularly near the combustion chamber, into that chamber.

Another auxiliary or supplemental device which may be employed in connection with the fuel delivery mechanism, is shown in Fig. 14, and comprises briefly a cam-controlled valve for admitting additional air or steam to the fuel pipe and for thus augmenting the effect of the previously described introducing blast. If the motor is operating upon the Otto cycle this augmenting will tend to counteract the retarding effect of the increase of pressure in the combustion chamber following the introduction of the first portion of the charge, so that not only may the rate of injection of the fuel be maintained constant, but it even may be increased if desired. When the motor is operating upon the Diesel cycle, on the other hand, where the fuel is injected while the piston is moving on its power stroke, the augmenting of the introducing blast will give an increased rate of introduction to the fuel, and thus counteract the pressure-lowering effect of the increased piston speed so that the pressure throughout injection may remain constant, or even be increasing if so desired. In Fig. 14 the fuel charge under its normal air pressure is arranged to pass from suitable measuring and supplying devices such for example as have already been described through pipe 146 and into fuel pipe 147. At the proper instant needle valve 148 is opened by the cam 149 to uncover the end of the supplemental compressed air or steam supply pipe 150, thus causing the latter portion of the charge to be introduced at a higher rate than was the former portion. By varying the shape of cam 149 any desired time or rate of such increase can be obtained. The final injection of the fuel into the combustion chamber may be in the form of a spray by any of the usual or customary devices for such purposes, or it may be in the form of a solid stream, or in any modification or combination of both spray and stream. Furthermore, the fuel may be injected into the air in the combustion chamber, or it may be caused to pass through a portion of the air and then be thrown on to a hot surface, or it may even be injected directly against a heated surface or through or upon fragments of refractory material.

In Fig. 15 the fuel pipe 155 is shown as entering the combustion chamber at an inclination so that the fuel will be injected in the form of a fine stream and caused to pass through a very substantial amount of hot air before it comes into contact with the hot wall of the chamber.

Although in the foregoing description of the fuel measuring and delivery devices, mention has been made of but a single measuring and delivery device for the single combustion chamber shown in the drawings, the present invention is not limited thereto.

The motor has also been described as having its compressor crank set one quarter of a revolution in advance of the power crank thus giving a quarter of a revolution for the injection and combustion of the fuel, if the motor is operating upon the Otto cycle or some modification thereof. It is obvious, however, that a longer combustion period may be obtained if it is desirable or necessary by setting the compressor crank still farther in advance of the power crank. Thus if the cranks were 180° apart, substantially half a revolution would be available for combustion of the fuel, and even a longer period might be gained if the compressor crank were set still farther in advance of the power crank, and the outlet port valve was closed and the inlet port valve opened before the power piston had completed its downward stroke.

In the modification shown in Fig. 16, not only are the cranks of the compressor piston 160 and of the power piston 161 set opposite each other, thus giving to the motor the most perfect mechanical balance possible, but a storage tank or reservoir 162 is provided intermediate the compressor cylinder and the combustion chamber 163, communication between the reservoir and chamber being controlled by the valve 164. Not only does this arrangement permit wide variations in the combustion period by simply shifting the time of operation of the intermediate valve 164, but it also enables a single compressor cylinder and piston to supply compressed air to a plurality of combustion chambers and at various times during one revolution of the main shaft.

Another modification which gives even a still longer combustion period is that shown in Fig. 17 where two combustion chambers are provided for a single compressor cylinder and a single working cylinder, the two combustion chambers being arranged to be alternately thrown into communication with the working cylinder on alternate working strokes of the power piston. The cranks of the two cylinders are shown as set together so that a combustion chamber will be charged with compressed air while the power piston is making its exhaust stroke but will not be thrown into communication with the working cylinder until after a complete revolution. A combustion period equal to the time of one complete revolution is thus provided for each combustion chamber.

In Fig. 17, the compressor cylinder is shown as 168 and the power cylinder as 169, the two combustion chambers being indicated at 170 and 171. Suitable inlet and outlet port valves 172 are provided which are actuated by properly shaped cams upon a half speed shaft. The fuel measuring and delivery devices, shown in elevation in 173 and in section in 174, are substantially like those illustrated in Fig. 9 and already described. In the modification shown in this figure, means are also provided whereby water may be forced into the combustion chamber during or immediately after the injection of the fuel, the heated gases converting the water into steam with a corresponding reduction in the temperature, but an increase in the weight, of the power or working medium. The water supply devices are shown in elevation in 175 and in section in 176 and comprise measuring and delivery means substantially like those for measuring and supplying the fuel, 177 being the water supply pipe and 178 the compressed air pipe for admitting air behind the charge of water to force it into the combustion chamber. The water measuring valve 179 may be controlled by a governor like the fuel measuring valve and either with that valve or independently thereof govern the power of the motor. By using water from the water jackets 180 of the combustion chamber or 181 of the working cylinder (see Fig. 1), some of the heat lost to the walls of the combustion chamber or of the cylinder may be recovered, thus increasing the efficiency of the motor by cutting down the heat losses. By maintaining the water in the jacket 180, which surrounds the combustion chamber, under a sufficiently high pressure and temperature, the release of its pressure when it is injected into the combustion chamber may alone be sufficient to cause it to flash into steam.

The operation of the motor has been already described in connection with the various mechanisms, so that it will be necessary to refer at this point only to the method of setting it in operation. This may be accomplished in several well-known ways. For example, heat may be applied to the combustion chamber to raise it to the desired temperature, and the motor turned over by hand to cause the injection and ignition of the first charge of fuel. Or, air at a suitable temperature may be pumped into the combustion chamber by suitable hand devices, and the fuel charge then injected in a similar manner. Or, if the motor is not too large and the maximum compression is sufficiently high, it may be only necessary to turn the motor over by hand.

While in the accompanying drawings, the motor is shown as single acting, the present invention is not limited to such a construction. Furthermore, a plurality of working cylinders may be employed, either duplicates of the cylinder shown in the drawings, or arranged to receive and further expand the charge from the first cylinder. In the drawings the motor is shown as governed by varying the time of operation of the outlet port valve between the combustion chamber and the working cylinder in coöperation with the variation of the fuel charge. If desired, either of these devices may alone be used to control the speed of the motor, or both together, as illustrated. While the motor of the drawings is provided with two cams, one for causing the motor to operate on the Diesel cycle and the other for the Otto, still, it is obvious that by the proper shaping of the cam any desired combination or modification of these two cycles can be produced. Furthermore, although the motor heretofore described is primarily intended to operate with the air in the combustion chamber at a sufficiently high temperature to cause the fuel to ignite when it is injected therein, the present invention in all its details is not necessarily limited to such a construction, as many features are adapted for use in a motor employing an electric spark or some other igniting means. The motor of the drawings which constitute the subject of the present invention has been described as operating with either a liquid or a solid fuel, but it is obvious that if desired a gaseous fuel might be employed which could be introduced into the combustion chamber either by a pump or by the actuation of a valve if the gas were maintained under sufficiently high pressure.

As already pointed out in the foregoing description of the motor shown in the drawings, a blast of steam may be employed in the place of compressed air to inject the charge of fuel, and when in the claims the term compressed air is used in connection with fuel injecting or delivery devices, it is to be understood as covering a steam blast as well.

In the preferred construction, as already pointed out, the heat of the combustion chamber is relied upon to increase the temperature of the air due to compression and to raise the air in the combustion chamber to a temperature above that of ignition of the fuel. Except where so specifically described, however, the claims are not to be limited to such an arrangement, as in general it is immaterial whether the temperature of the air in the chamber is gained solely from the compression or solely from the chamber itself or from the combined effect of both, or even in other ways. Where the claims, therefore, recite means for supplying air to the chamber at a temperature above that of ignition of the fuel, it is to be understood that such temperature may be obtained in any of the above suggested ways.

Having thus described the nature and scope of the invention, what is claimed is:

1. A hydro-carbon motor, having, in combination, a working cylinder and piston, a combustion chamber, means for supplying the combustion chamber with air at a temperature above the temperature of ignition of the fuel beginning before and continuing after the working piston has reached the end of its working stroke, means for introducing fuel into the combustion chamber, and means for throwing the combustion fuel into and out of communication with the working cylinder, substantially as described.

2. A hydro-carbon motor, having, in combination, a working cylinder and piston, a combustion chamber, a connection between the chamber and the cylinder, a valve controlling said connection, means for causing the combustion of fuel in said chamber, and means for opening and closing said valve constructed and arranged to permit the time of closing of said valve to be varied without reversing the direction of rotation of the motor, substantially as described.

3. A hydro-carbon motor, having, in combination, a working cylinder and piston, a combustion chamber, a connection between the chamber and the cylinder, a valve controlling said connection, means for causing the combustion of fuel in said chamber, and speed controlled means for varying the time of closing of said valve, substantially as described.

4. A hydro-carbon motor, having, in combination, a working cylinder and piston, a combustion chamber, a connection between the chamber and the cylinder, a valve controlling said connection, means for causing the combustion of fuel in said chamber, and means under control of the operator to permit the time of closing of said valve to be varied without reversing the direction of rotation of the motor, substantially as described.

5. A hydro-carbon motor, having, in combination, a working cylinder and piston, a combustion chamber, a connection between the chamber and the cylinder, a valve controlling said connection, means for causing the intermittent combustion of fuel in said chamber, and means for closing said valve before the piston reaches the limit of its outward movement, substantially as described.

6. A hydro-carbon motor, having, in combination, a working cylinder and piston, a combustion chamber, a connection between the chamber and the cylinder, a valve controlling said connection, means for delivering compressed air to the combustion chamber, and means for actuating the valve constructed and arranged to hold the valve open during a portion of the time of the delivery of the compressed air into the combustion chamber to vary the charge of air in the combustion chamber, substantially as described.

7. A hydro-carbon motor, having, in combination, a working cylinder and piston, a combustion chamber, a connection between the chamber and the cylinder, a valve controlling said connection, means for delivering compressed air to the combustion chamber, means for causing the combustion of fuel in the chamber, and means for actuating the valve constructed and arranged to open the valve to permit the contents of the chamber to partially expand into the cylinder and then to close the valve to retain a substantial pressure in the chamber.

8. A hydro-carbon motor, having, in combination, a working cylinder and piston, a combustion chamber, means for throwing said combustion chamber into and out of communication with the working cylinder, and means for admitting compressed air to the combustion chamber while said chamber is in communication with the working cylinder, to scavenge the combustion chamber, substantially as described.

9. A hydro-carbon motor, having, in combination, a working cylinder, a piston, a combustion chamber, a connection between the chamber and the cylinder, a valve controlling said connection, means for supplying air to said combustion chamber for the combustion of the fuel, means for introducing fuel into said combustion chamber, and means for actuating the valve constructed and arranged to hold the valve open until after the delivery of compressed air to the combustion chamber has begun, to scavenge the combustion chamber, substantially as described.

10. A hydro-carbon motor, having, in combination, a working cylinder and piston, a compression cylinder and piston, a combustion chamber connected with the compressor and the working cylinders, an admission valve controlling the connection between the combustion chamber and the compressor cylinder, and means for actuating said valve constructed and arranged to vary the time of opening of said valve without reversing the direction of rotation of the motor, substantially as described.

11. A hydro-carbon motor, having, in combination, a working cylinder and piston, a combustion chamber, means for supplying said chamber with compressed air at a temperature above the temperature of ignition of the fuel, said means including a compressed air reservoir, connections for delivering air from said reservoir to the chamber, and a compressor cylinder and piston connected with said reservoir, and means for throwing the chamber into and out of communication with the working cylinder, substantially as described.

12. A hydro-carbon motor, having, in combination, a cylinder, a piston, a combustion chamber, means for supplying the combustion chamber with air at a temperature above the temperature of ignition of the fuel, means for throwing said chamber into and out of communication with the cylinder, means for introducing fuel into said chamber, and means for introducing water while said chamber is out of communication with the cylinder, substantially as described.

13. A hydro-carbon motor, having, in combination, a cylinder, a piston, a combustion chamber, means for supplying the combustion chamber with air at a temperature above the temperature of ignition of the fuel, means for introducing fuel into the combustion chamber, and means for introducing water into said chamber while fuel is being introduced, substantially as described.

14. The method of operating hydro-carbon motors which consists in burning the fuel in a closed combustion chamber, permitting the contents of said chamber to expand into a working cylinder, and scavenging the combustion chamber into the working cylinder, substantially as described.

15. The method of operating hydro-carbon motors which consists in supplying compressed air to a closed chamber, burning the fuel in said chamber, allowing the contents of said chamber to expand into a working cylinder, and supplying compressed air to the combustion chamber to drive the remaining products of combustion into the working cylinder, and to provide compressed air for the combustion of the next charge of fuel, substantially as described.

16. The method of operating hydro-carbon motors which consists in supplying compressed air to a closed combustion chamber, burning fuel in the chamber, permitting the contents of the chamber to expand partially into a working cylinder, cutting off such expansion, and then supplying compressed air to the chamber for the combustion of the next charge of fuel, substantially as described.

17. The method of operating hydro-carbon motors which consists in introducing fuel into a closed chamber containing air at a temperature above the temperature of ignition of the fuel, introducing water into said chamber, and thereafter permitting the contents of said chamber to expand into a working cylinder, substantially as described.

18. The method of operating hydro-carbon motors which consists in introducing fuel into a closed combustion chamber containing air at a temperature above the temperature of ignition of the fuel, permitting the contents of the chamber to expand into a working cylinder, and introducing more fuel into the chamber, substantially as described.

19. A hydro-carbon motor, having, in combination, a working cylinder, a piston, a combustion chamber, means for supplying the combustion chamber with air at a temperature above the temperature of ignition of the fuel, means for throwing the combustion chamber into and out of communication with the working cylinder, means for introducing fuel into the combustion chamber, and devices for rendering said means operative to introduce fuel while said chamber is either in or out of communication with the working cylinder at the will of the operator and during the continuous operation of the motor in the same direction, to vary the cycle of operation of the motor, substantially as described.

20. A hydro-carbon motor, having, in combination, a cylinder and piston, a combustion chamber, means for supplying the combustion chamber with air at a temperature above the temperature of ignition of the fuel, means for introducing fuel into the combustion chamber, means for throwing the combustion chamber into communication with the cylinder during the first portion of the working stroke of the piston and out of communication with said cylinder before the piston completes its working stroke, substantially as described.

21. The method of operating hydro-carbon motors which consists in introducing fuel into a combustion chamber containing air at a temperature above the temperature of ignition of the fuel, introducing water into said chamber while fuel is being introduced therein, and permitting the contents of said chamber to expand into a working cylinder, substantially as described.

22. A hydro-carbon motor, having, in combination, a working cylinder, a piston, a combustion chamber, means for supplying said chamber with compressed air at a temperature above the temperature of ignition of the fuel, means for throwing the combustion chamber into and out of communication with the working cylinder, and means including a double cam for introducing fuel into the combustion chamber, and mechanism for rendering one or the other of the cam surfaces operative to vary the time of introduction of the fuel during the continuous operation of the motor in the same direction, substantially as described.

23. A hydro-carbon motor, having, in combination, a working cylinder and piston, a combustion chamber, a connection between the chamber and the cylinder, a valve controlling said connection, means for delivering compressed air to the combustion chamber, and means for actuating the valve constructed and arranged to hold the valve open for varying durations of time to permit the escape of air from the chamber to vary the charge of compressed air in said chamber, substantially as described.

24. A hydro-carbon motor, having, in combination, a working cylinder and piston, a combustion chamber, a connection between the chamber and the cylinder, a valve controlling said connection, means for delivering compressed air to the combustion chamber, and speed controlled means for actuating the valve, substantially as described.

25. The method of controlling hydro-carbon motors having a combustion chamber separate from the working cylinder, which consists in varying the amount of the charge in the combustion chamber by permitting a portion of the contents of said chamber to escape therefrom into the working cylinder prior to combustion, substantially as described.

26. The method of operating hydro-carbon motors which consists in introducing compressed air into a closed combustion chamber, permitting a portion of such air to escape from the chamber to vary the charge therein, burning fuel in the chamber and permitting the contents to expand into the working cylinder, substantially as described.

27. A hydro-carbon motor, having, in combination, a working cylinder and piston, a combustion chamber, a compression cylinder and piston independent of the working cylinder, connections between the combustion chamber and the working and compression cylinders, and connections between the compression and working pistons timed to actuate the compression piston to make its compression stroke during a portion of both the working and exhaust strokes of the working piston, substantially as described.

28. A hydro-carbon motor, having, in combination, a working cylinder and piston, a combustion chamber, a compression cylinder and piston independent of the working cylinder, connections between the combustion chamber and the working and compression cylinders, and connections between the compression and working pistons timed to actuate the compression piston to begin its compression stroke after the working piston has begun and before it has completed its working stroke, substantially as described.

In testimony whereof I affix my signature, in presence of two witnesses.

GUY B. COLLIER.

Witnesses:
 ALFRED H. HILDRETH,
 WARREN G. OGDEN.